(12) United States Patent
Yeh et al.

(10) Patent No.: US 7,596,857 B2
(45) Date of Patent: Oct. 6, 2009

(54) METHOD FOR MANUFACTURING A KEYBOARD

(75) Inventors: Chih-Feng Yeh, Taipei Hsien (TW); Jen-Min Huang, Taipei Hsien (TW); Shih-Lin Chiu, Taipei Hsien (TW)

(73) Assignee: Wistron Corp., Hsichih (TW)

( * ) Notice: Subject to any disclaimer, the term of this patent is extended or adjusted under 35 U.S.C. 154(b) by 44 days.

(21) Appl. No.: 11/730,027

(22) Filed: Mar. 29, 2007

(65) Prior Publication Data

US 2008/0034577 A1 Feb. 14, 2008

(30) Foreign Application Priority Data

Aug. 10, 2006 (TW) .............................. 95129369 A

(51) Int. Cl.
*H01H 11/00* (2006.01)
*H01H 65/00* (2006.01)

(52) U.S. Cl. .............. 29/622; 29/845; 29/848; 29/858; 200/5 A; 200/308; 200/341; 200/512; 200/517

(58) Field of Classification Search ............... 29/622, 29/450, 846, 848, 858; 200/5 A, 308, 341, 200/512, 517; 264/297.2; 442/50, 58, 117
See application file for complete search history.

(56) References Cited

U.S. PATENT DOCUMENTS 6,291,369 B1 * 9/2001 Yoshikawa et al. ............ 442/58
6,621,027 B1 * 9/2003 Shimizu et al. .............. 200/341

FOREIGN PATENT DOCUMENTS

CN 2540072 Y 3/2003

* cited by examiner

*Primary Examiner*—Thiem Phan

(57) ABSTRACT

A method manufactures a keyboard with injecting keys and an inmold metal sheet. The bottoms of grooves of the keys are combined with an elastic material layer to form a keyboard. The metal layer is disposed at a surface of said keyboard.

8 Claims, 5 Drawing Sheets

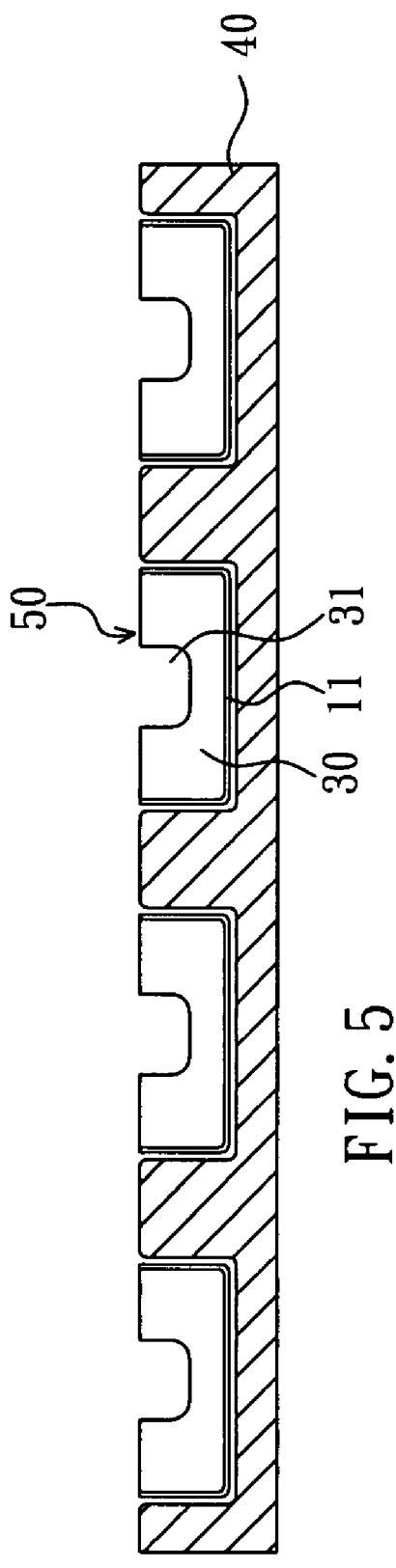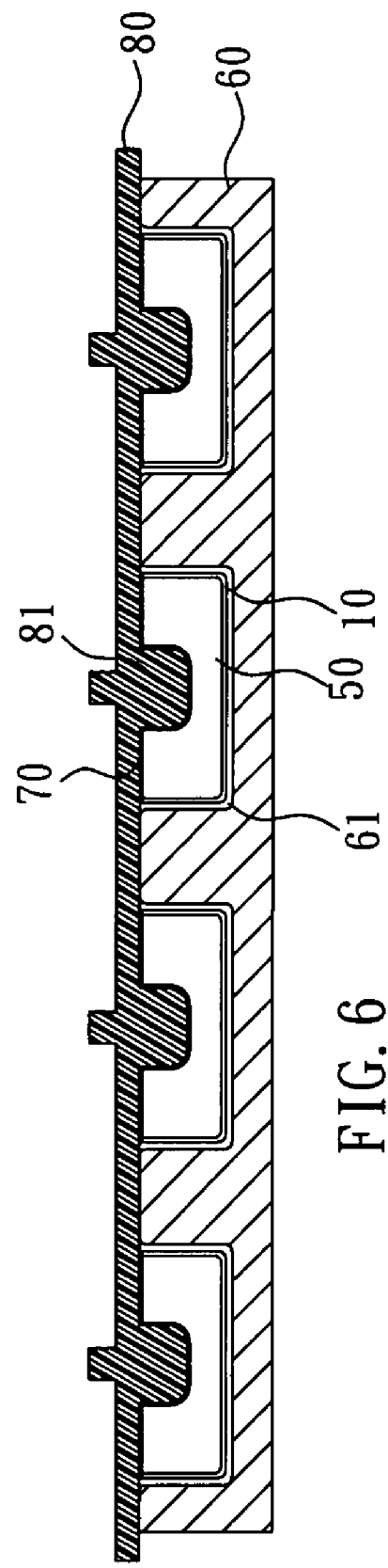

METHOD FOR MANUFACTURING A KEYBOARD

BACKGROUND OF THE INVENTION

1. Field of the Invention

The present invention relates to a keyboard, and more particularly to a keyboard with metal keys and the manufacturing thereof.

2. Description of Related Art

A conventional manufacturing method of a keyboard generally is to print necessary color digits and symbols on a polycarbonate (PC) film first, and then cause the PC film to be formed to provide with a several projection portions by means of a vacuum drawing mold so as to be used as keys. Next, inner parts of the projection portions are filled with a PC material in the mold and the PC film is then cut to form an external form of a keyboard by stamping. Furthermore, the PC material is caused to combine with a rubber layer through an ultraviolet (UV) resin to form the keyboard.

Taiwan patent application No. 096,110,141 applied by the applicant of the present invention discloses a method for combining inmold decoration technology with a manufacturing of a keyboard with keys having a higher height and smaller interval and a keyboard made thereby, allowing a plastic film with a plurality of projections manufactured by inmold decoration and injection technologies to be cut into a plurality of projection particles and bottoms of the projection particles are combined with an elastic material layer to form a keyboard. The interval between each two projection particles of the keyboard is smaller than the one between each two projections of the plastic film so as to be convenient to manufacture a keyboard with keyboards having a height satisfying consumers by means of inmold decoration and injection technologies.

Vacuum electroplating or sputtering the plastic keys is needed if the plastic keys are caused to have a metal color. For example, Taiwan Patent No. I257,564 discloses a metal keyboard and the manufacturing thereof, a thermoplastic resin is utilized to form a key by an injection molding process and a conductive layer is then formed on one surface of the key. Next, a function sign is marked on the conductive layer and a metal layer, which is formed by an electrolytic plating process, sputtering process, chemical vapor deposition process or electroless plating process, is formed on the conductive layer besides the function sign.

The manufacturing method for forming the metal layer on a plastic key by the manufacturing process such as electroplating or sputtering mentioned above is rather time consuming. Besides, the quality of the plastic key with the metal color made by the process such as electroplating still is worse than a metal key made from a metal sheet.

SUMMARY OF THE INVENTION

For elevating the quality of a keyboard with metal-layered keys, the present invention is proposed.

The main object of the present invention is to provide a method for manufacturing a keyboard by injecting keys with an inmold metal sheet and a keyboard made thereby, forming an outer layer of each key directly with a metal sheet to enable the keyboard with the metal keys to have more quality.

Another object of the present invention is to provide a method for manufacturing a keyboard by injecting keys with an inmold metal sheet and a keyboard made thereby, capable of manufacturing the keyboard with a real metal covered on keys so as to elevate the value of the keyboard with the metal keys.

A method for manufacturing a keyboard by injecting keys with an inmold metal sheet according to the present invention comprises the following steps:

(1) using drawing technology to cause a metal sheet to form a plurality projection portions;

(2) placing the metal sheet with the projection portions in an injection mold and then allowing a plastic material to be injected out via a injection tunnel of the injection mold to fill an inner part of each projection portion;

(3) causing the metal sheet with the inner parts of the projection portions combined with the plastic material to be cut into a plurality of separated keys by a stamping jig; and (4) placing the keys respectively into a plurality of groove of a combination jig and allowing the bottoms of the keys to be combined with an elastic material layer to form a keyboard with the metal sheet covered on the surfaces of the needed keys.

The method can further comprises a step of cutting the elastic material layer to form the keyboard after allowing the bottoms of the keys to be combined with an elastic material layer in Step (4).

Step (4) can further comprise pressing to attach the elastic material layer after allowing the bottoms of the keys to be spread with a ultraviolet resin, illuminating with a ultraviolet lamp to cause the ultraviolet resin to be cured to enable the elastic material layer to be combined with the keys or using an adhesive to cause the elastic material layer to be stuck onto the keys.

Step (2) can further comprise allowing the bottom of the plastic material filled in the inner part of each projection portion to be formed with a groove; the elastic material layer has raised parts corresponding to the grooves in Step (4); the raised parts are engaged with the grooves.

A keyboard according to the present invention is manufactured by the method for manufacturing a keyboard by injecting keys with an inmold metal sheet mentioned above, it comprises an elastic material layer and a plurality of keys combined therewith, a metal sheet is covered on surfaces of the keys, an inner part of each key is filled with a plastic material. The metal sheet can be a material such as aluminum, stainless steel, gold or silver; the plastic can be polyester, the elastic material layer can be a rubber layer. The elastic material layer and the keys can be combined with each other by means of an ultraviolet resin or adhesive.

The elastic layer and the keys respectively have raised parts and grooves and the raised parts are respectively engaged with the grooves.

BRIEF DESCRIPTION OF THE DRAWINGS

The present invention can be more fully understood by reference to the following description and accompanying drawings, in which:

FIG. 5 is a schematic view, showing that a plurality of separated keys are placed in a stamping jig according to the present invention;

FIG. 6 is a schematic view, showing that a plurality of separated keys are combined with a rubber layer in a combination jig according to the present invention;

DETAILED DESCRIPTION OF THE PREFERRED EMBODIMENTS

Figure 1:
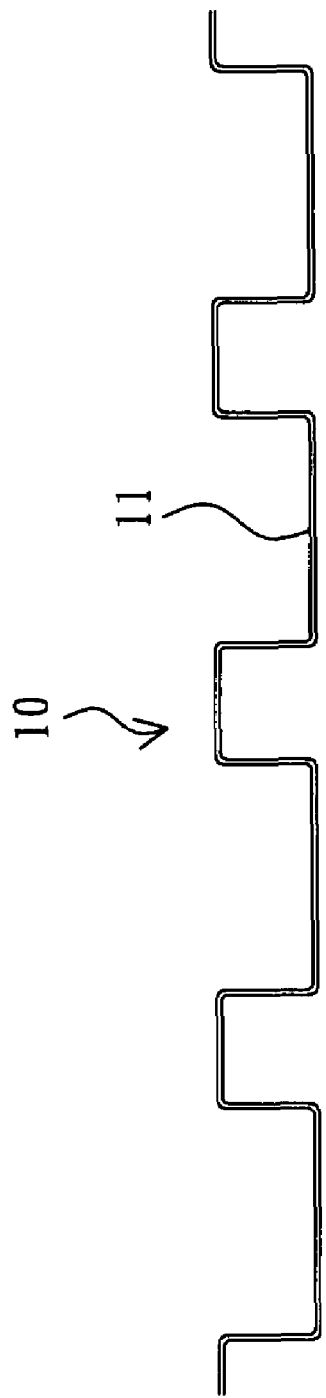
FIG. 1 is a schematic view, showing a metal sheet with a plurality of projections according to the present invention.

Please refer to FIGS. 1 to 8. A method for manufacturing a keyboard by injecting keys with an inmold metal sheet is to allow the metal sheet to be formed as an outer layer of keys to enable the keyboard with the metal keys to have a better quality. A method of a preferred embodiment of the present invention comprises the following steps:

Step a: using drawing technology to allow a metal sheet 10 to be formed with a plurality of projection portions 11 as FIG. 1 shows; the metal sheet 10 is printed with needed color digits and signs before it is drawn.

Figure 2:
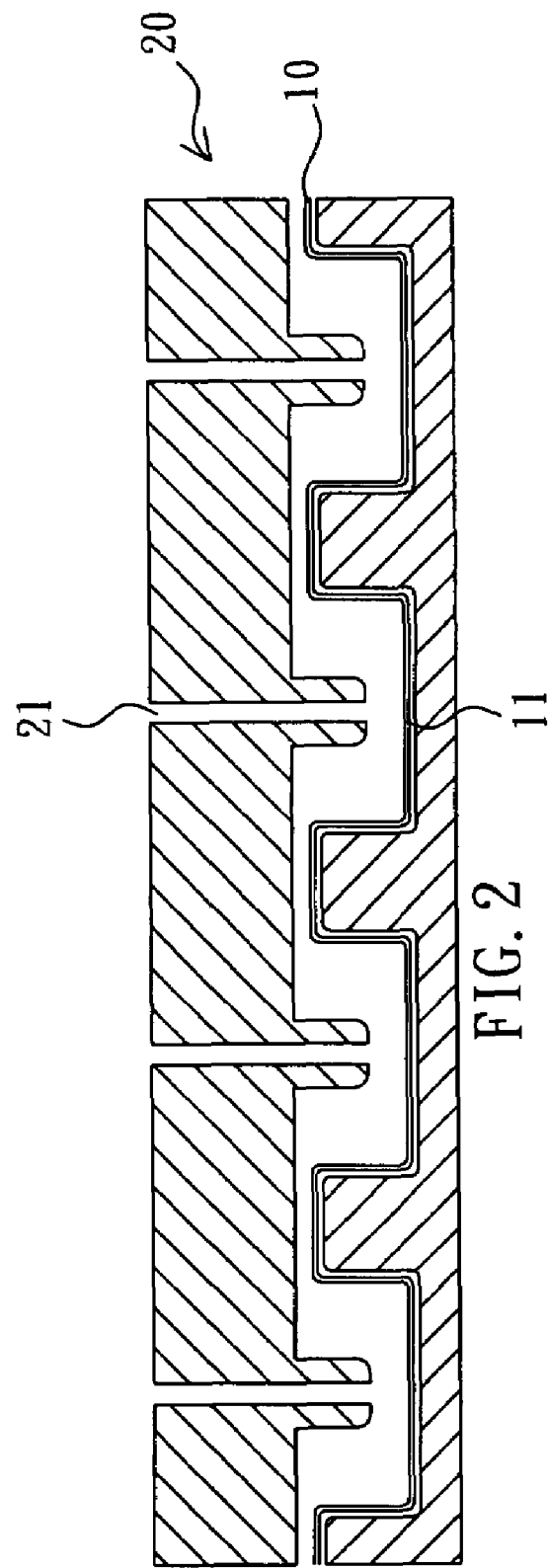
FIG. 2 is a schematic view, showing a metal sheet positioned in an injection mold according to the present invention.
Figure 3:
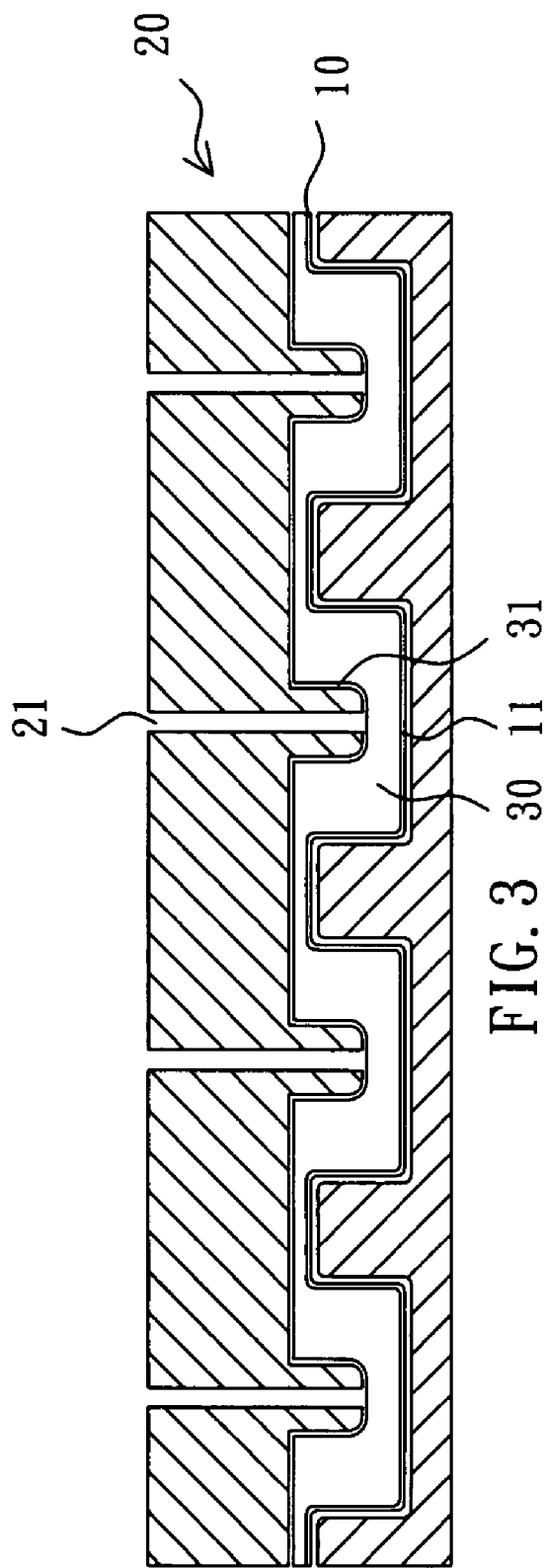
FIG. 3 is a schematic view, showing that a PC material is filled inside projection portions of a metal sheet according to the present invention.
Figure 4:
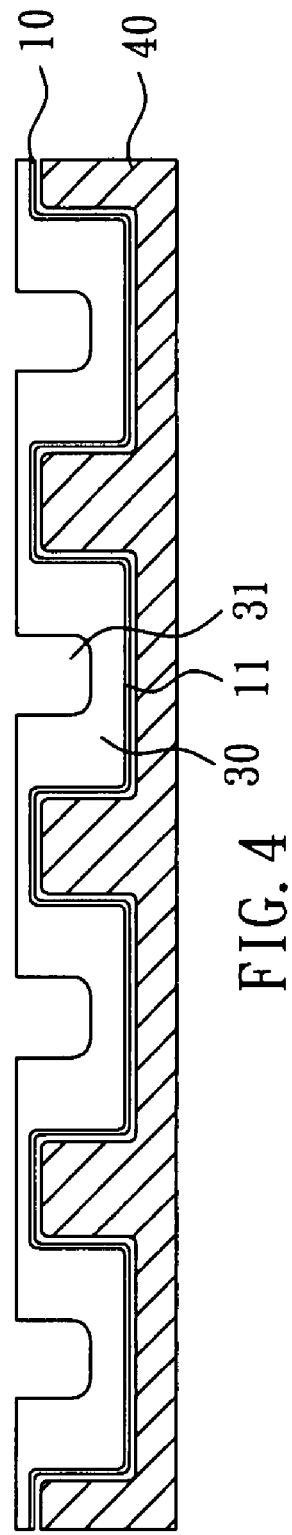
FIG. 4 is a schematic view, showing that internal parts of projection portions combined with a metal sheet of a PC material are placed in a stamping jig according to the present invention.

Step b: placing the metal sheet 10 with projections 11 in an injection mold 20 as FIG. 2 shows, then causing a PC material 30 to be injected out via a injection tunnel 21 of the mold 20 to fill an inner part of the projection portions 11 of the metal sheet 10 and allow a place at a bottom of the PC material 30 corresponding to each projection portion 11 to be formed with a groove 31 as FIGS. 3 and 4 show.

Step c: placing the metal sheet 10 with the inner part of the projection portions 11 thereof combined with the PC material 30 into a stamping jig 40 as FIG. 4 shows to cut it into a plurality of separated keys 50 as FIG. 5 shows.

Step d: placing the keys 50 respectively into a plurality of grooves 61 of the combination jig 60, then spreading ultraviolet resin 70 on a bottom of each key 50, pressing to attach an elastic material layer such as a rubber layer 80 thereon and finally illuminate the UV resin 70 with an UV lamp to cause it to be cured so as to allow the rubber layer 80 to be fixedly combined with the keys 50 as FIG. 6 shows. Here, the rubber layer 80 has raised parts 81 respectively engaged with the grooves 31 of the keys 50 as FIGS. 5 and 6 shows.

Figure 7:
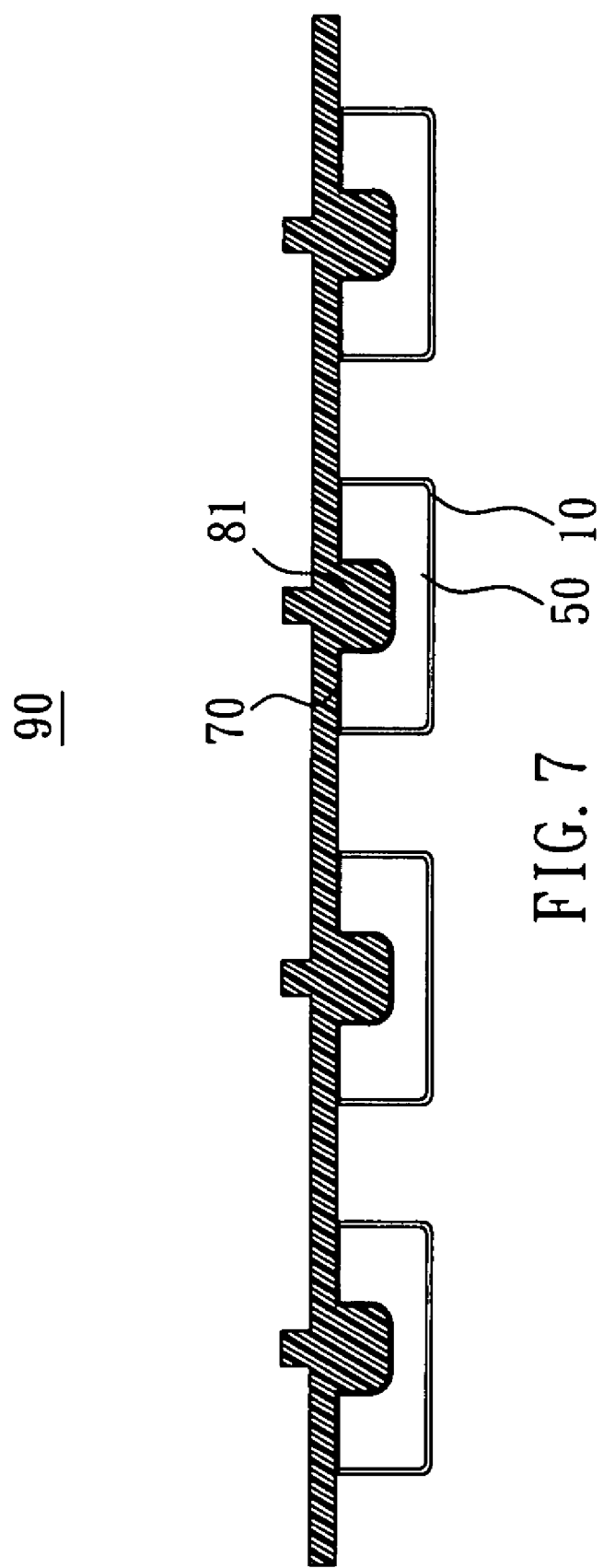
FIG. 7 is a schematic view, showing a keyboard with each key covered with a metal sheet according to the present invention.
Figure 8:
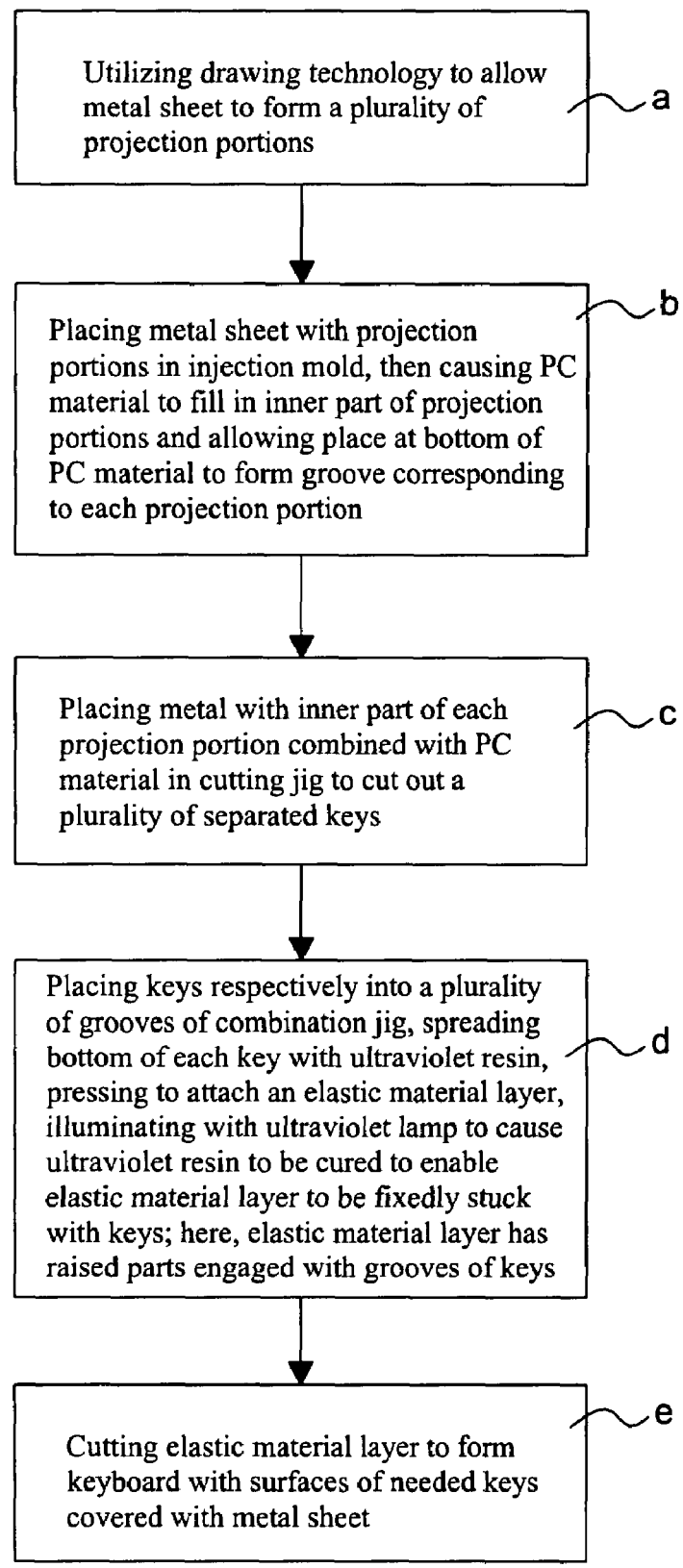
FIG. 8 is a flow chart of the present invention.

Step e: cutting the rubber layer 80 to form a keyboard 90 with the metal sheet 10 on the surfaces of the needed keys 50 as FIG. 7 shows. But, the work for cutting the rubber layer 80 is not necessary if the dimension of the rubber layer 80 is fit in with the requirement, i.e. the elastic material layer pressed in Step d can be a cut dimension-matched rubber layer so that Step e is not needed.

The keyboard 90 with the metal sheet 10 formed on the surfaces of the keys 50 cab be manufactured by means of the steps mentioned above; this can allow the keyboard 90 to have better quality.

The metal sheet 20 according to the present invention can be made from a metal material such as aluminum, stainless steel, gold or silver. The PC material 30 can be polyester or other rubber material.

The keys 50 can be allowed to stably combine with the rubber layer 80 by means of not only the UV resin 70 but also an adhesive or an engagement of grooves 31 and the projection portions 81 according to the present invention.

A drawing-formed metal sheet matching up with injection technology can allow a keyboard with a metal sheet on surfaces of keys to be manufactured according to the present invention. This not only enables the keyboard to have better quality but also can elevate the value of the keyboard with the metal keys.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing a keyboard by injecting keys with an inmold metal sheet, allowing a metal sheet to be formed at a surface of a key to enable a keyboard with said metal keys to have better quality, comprising the following steps:

(1) utilizing drawing technology to cause a metal sheet to form a plurality of projection portions;

(2) placing said metal with said projection portions into an injection mold and then allowing a plastic material to be injected out via a injection tunnel of said injection mold to fill in an inner part of said projection portions;

(3) allowing said metal sheet with said inner part of each said projection portion combined with said plastic material to be cut out by a stamping jig to form a plurality of separated keys; and (4) allowing said keys to be respectively placed into a plurality of grooves of a combination jig and allowing bottoms of said keys to be combined with an elastic material layer to form a keyboard with said metal sheet disposed at surfaces of said needed keys.

2. The method according to claim 1, wherein Step (4) further comprises cutting said elastic material layer to form said keyboard after said bottoms of said keys to be combined with said elastic material.

3. The method according to claim 1, wherein a material of said metal sheet is selected from a group consisting of aluminum, stainless steel, gold and silver; said plastic material is polyester, said elastic material layer is a rubber layer.

4. The method according to claim 1, wherein Step (4) further comprises pressing said elastic material layer and then illuminating with a ultraviolet lamp to cause a ultraviolet resin to be cured to enable said elastic material layer to be combined with said keys after allowing said bottoms of said keys to be spread with said ultraviolet resin.

5. The method according to claim 1, wherein utilizing an adhesive to cause said elastic material layer to be stuck on said keys.

6. The method according to claim 1, wherein Step (2) further comprises allowing a groove is formed on a bottom of said plastic material filled in said inner part of said projection portion and said elastic material layer has raised parts respectively corresponding to said grooves in Step (4); said raised parts are directly engaged with said grooves.

7. The method according to claim 6, wherein Step (4) further comprises pressing said raised parts and then illuminating with a ultraviolet lamp to cause a ultraviolet resin to be cured to enable said elastic material layer to be combined with said keys after allowing said grooves to be spread with said ultraviolet resin before said raised parts are engaged in said grooves.

8. The method according to claim 7, wherein a material of said metal sheet is selected from a group consisting of aluminum, stainless steel, gold and silver; said plastic material is polyester, said elastic material layer is a rubber layer.

* * * * *